US012135089B2

(12) United States Patent
Stednitz (10) Patent No.: US 12,135,089 B2
(45) Date of Patent: Nov. 5, 2024

(54) METERING VALVE (71) Applicant: Strahman Valves, Inc., Bethlehem, PA (US)

(72) Inventor: Samuel Gregory Stednitz, Saint Clair, PA (US)

(73) Assignee: Strahman Valves, Inc., Bethlehem, PA (US)

( * ) Notice: Subject to any disclaimer, the term of this patent is extended or adjusted under 35 U.S.C. 154(b) by 0 days.

(21) Appl. No.: 17/217,013

(22) Filed: Mar. 30, 2021

(65) Prior Publication Data

US 2022/0316601 A1   Oct. 6, 2022

(51) Int. Cl.
*F16K 1/46* (2006.01)
*F16K 1/38* (2006.01)
*F16K 15/06* (2006.01)
*F16K 27/02* (2006.01)

(52) U.S. Cl.
CPC ........... *F16K 1/385* (2013.01); *F16K 1/46* (2013.01); *F16K 15/063* (2013.01); *F16K 27/0254* (2013.01)

(58) Field of Classification Search
CPC ........ F16K 1/385; F16K 1/46; F16K 27/0254; F16K 1/48
See application file for complete search history.

(56) References Cited

U.S. PATENT DOCUMENTS

| | | | | |
|---|---|---|---|---|
| 2,197,384 A | * | 4/1940 | Raybould | ................. F16K 1/46 251/332 |
| 2,319,404 A | * | 5/1943 | Hoeh | ..................... F16K 1/385 251/224 |
| 4,114,851 A | | 9/1978 | Shivak et al. | |
| 4,773,442 A | | 9/1988 | Lephilibert | |
| 7,975,984 B1 | | 7/2011 | Novruzov et al. | |
| 2006/0102867 A1 | * | 5/2006 | Matsuhashi | ............... F16K 1/04 251/368 |
| 2008/0217573 A1 | | 9/2008 | Pulcini et al. | |
| 2017/0248274 A1 | * | 8/2017 | Ozaki | ....................... F16K 1/02 |
| 2018/0216745 A1 | * | 8/2018 | Gabriel | ..................... F16K 1/42 |
| 2019/0107223 A1 | * | 4/2019 | Ferrari | .................... F16K 15/18 |

FOREIGN PATENT DOCUMENTS

CN   204784785 U   11/2015

OTHER PUBLICATIONS

PCT International Search Report and Written Opinion dated Jun. 30, 2022, Application No. PCT/US2022/022567, 15 pages.
Notiifcation of Transmittal of International Preliminary Report on Patentability and Written Opinion dated Oct. 12, 2023, corresponding to Application No. PCT/US2022/022567, 9 pages.

* cited by examiner

*Primary Examiner* — Paul J Gray
(74) *Attorney, Agent, or Firm* — Barley Snyder (57) ABSTRACT

A fluid metering valve comprises a valve body including an inlet opening and an outlet opening. A seal ring is installed within the valve body and defines an opening in communication with the inlet opening and the outlet opening. A valve assembly is arranged at least partially within the valve body and includes a valve stem and a piston moveably mounted to the valve stem with at least one degree of freedom. The piston is moveable into and out of sealing contact with the seal ring via the stem for selectively permitting fluid flow between the inlet opening and the outlet opening through the opening in the seal ring.

13 Claims, 8 Drawing Sheets

METERING VALVE

FIELD OF THE INVENTION

The present disclosure is related to the field of valves, more particularly, to fluid metering valves.

BACKGROUND

Metering valves for selectively controlling fluid flow are widely used across many industries. Critical valve characteristics include reliable internal sealing for retaining the fluid under control within the valve without undesired leakage. The service life of the valve is also of significant importance, and thus, it is desirable to have a valve which minimizes wear of its critical components in order to provide reliable and consistent performance over its life. Further still, the accuracy by which fluid flow can be controlled by the valve may be of significant importance depending on the application.

Accordingly, a need exists for improved fluid control valves, and more specifically, a fluid metering valve which improves on these important areas of performance, while remaining cost effective.

SUMMARY

According to one embodiment of the present disclosure, a fluid metering valve comprises a valve body including an inlet opening and an outlet opening. A seal ring is installed within the valve body and defines an opening in communication with the inlet opening and the outlet opening. A valve assembly is arranged at least partially within the valve body and includes a valve stem and a piston moveably mounted to the valve stem with at least one degree of freedom. The valve stem and piston are moveable into and out of sealing contact with the seal ring for selectively permitting fluid flow between the inlet opening and the outlet opening through the opening in the seal ring.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

It is to be understood that the embodiments described herein are disclosed by way of illustration only. It is not intended that the disclosure be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figures 1, 2:
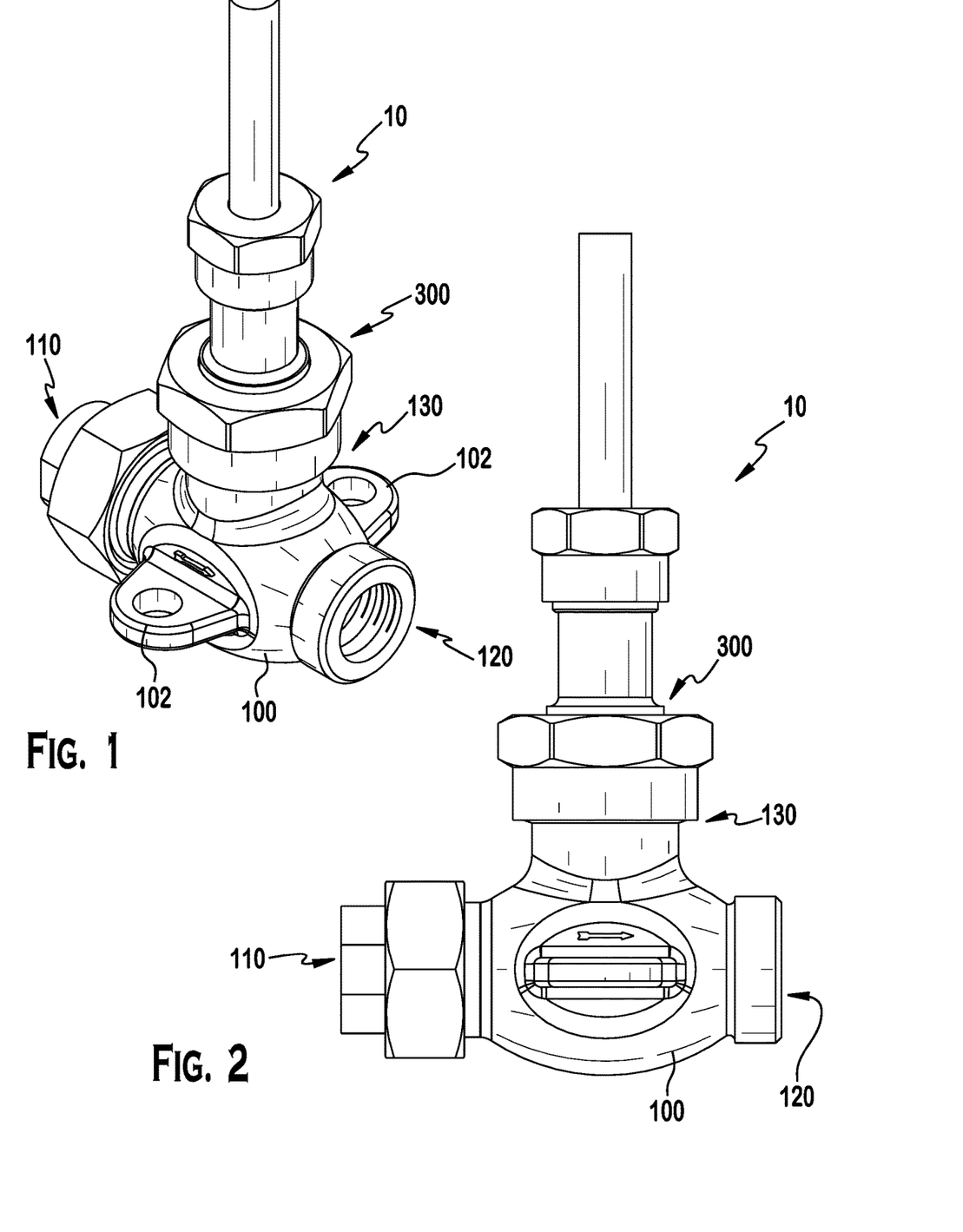
FIG. 1 is a front perspective view of a metering valve in accordance with the present disclosure.
FIG. 2 is right side view of the meter valve of FIG. 1 in accordance with the present disclosure.
Figures 3, 4:
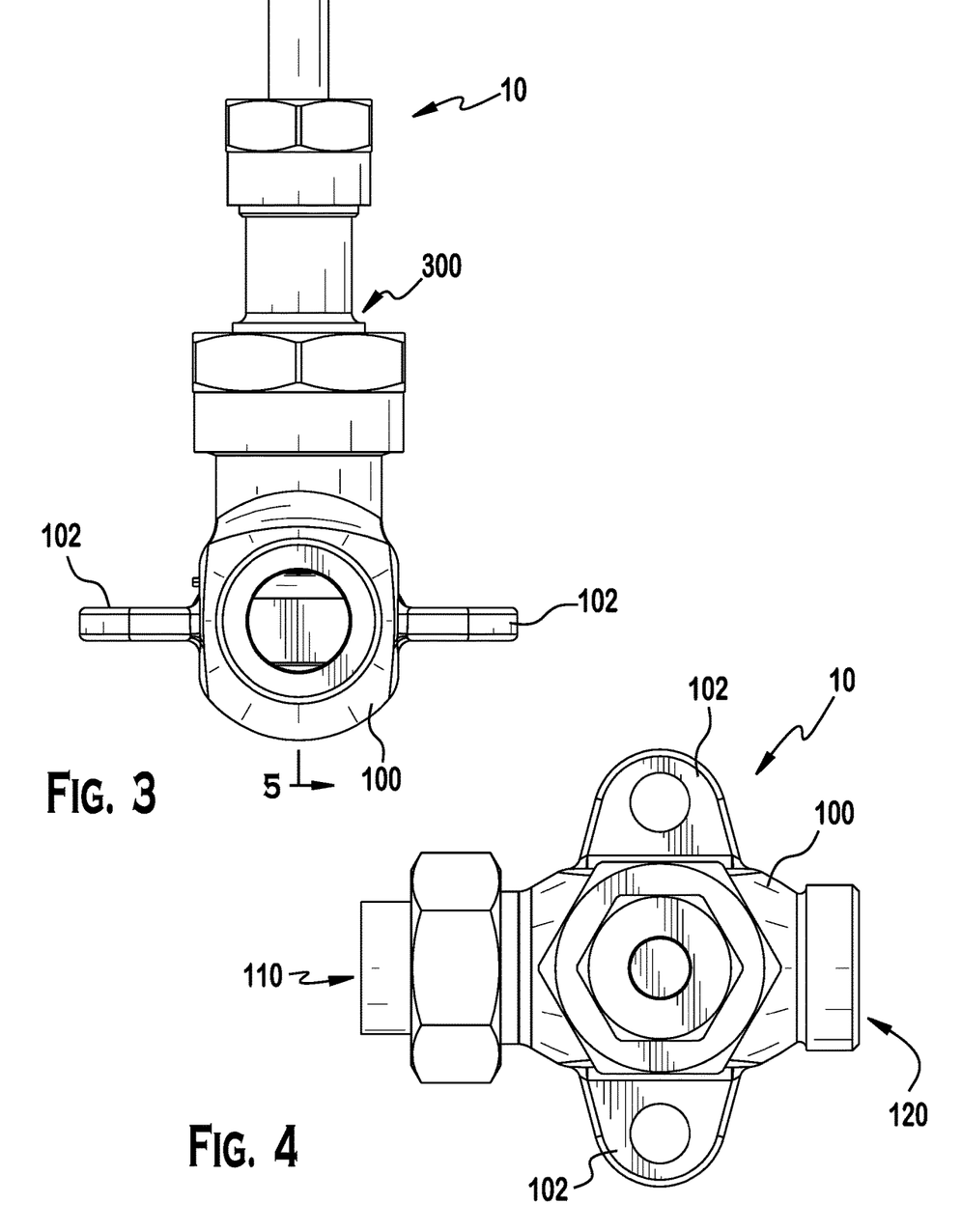
FIG. 3 is a front view of the metering valve of the preceding figures in accordance with the present disclosure.
FIG. 4 is a top view of the metering valve of the preceding figures in accordance with the present disclosure.
Figure 5:
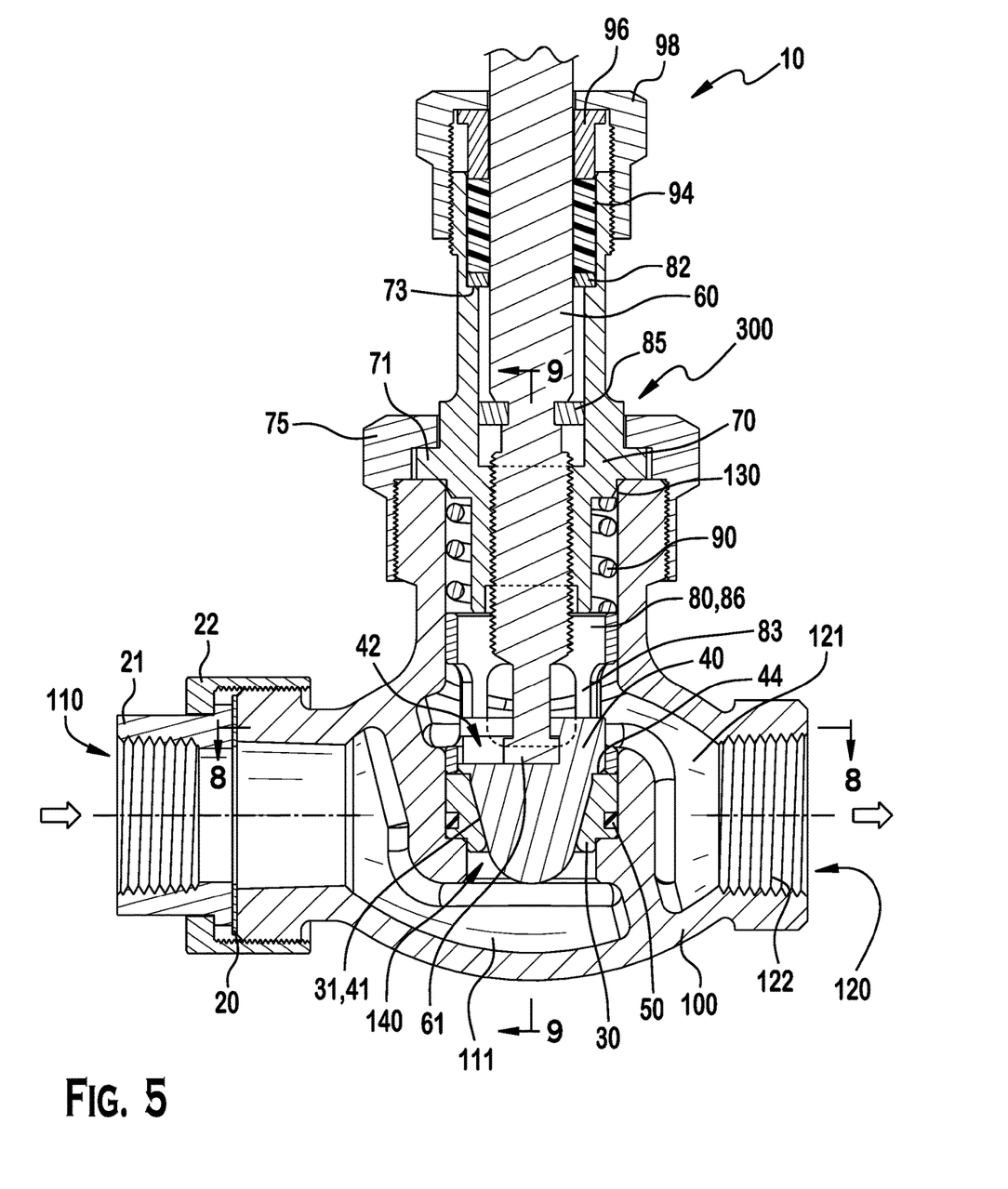
FIG. 5 is a right side cross sectional view of the metering valve of the preceding figures in a closed position in accordance with the present disclosure.
Figure 6:
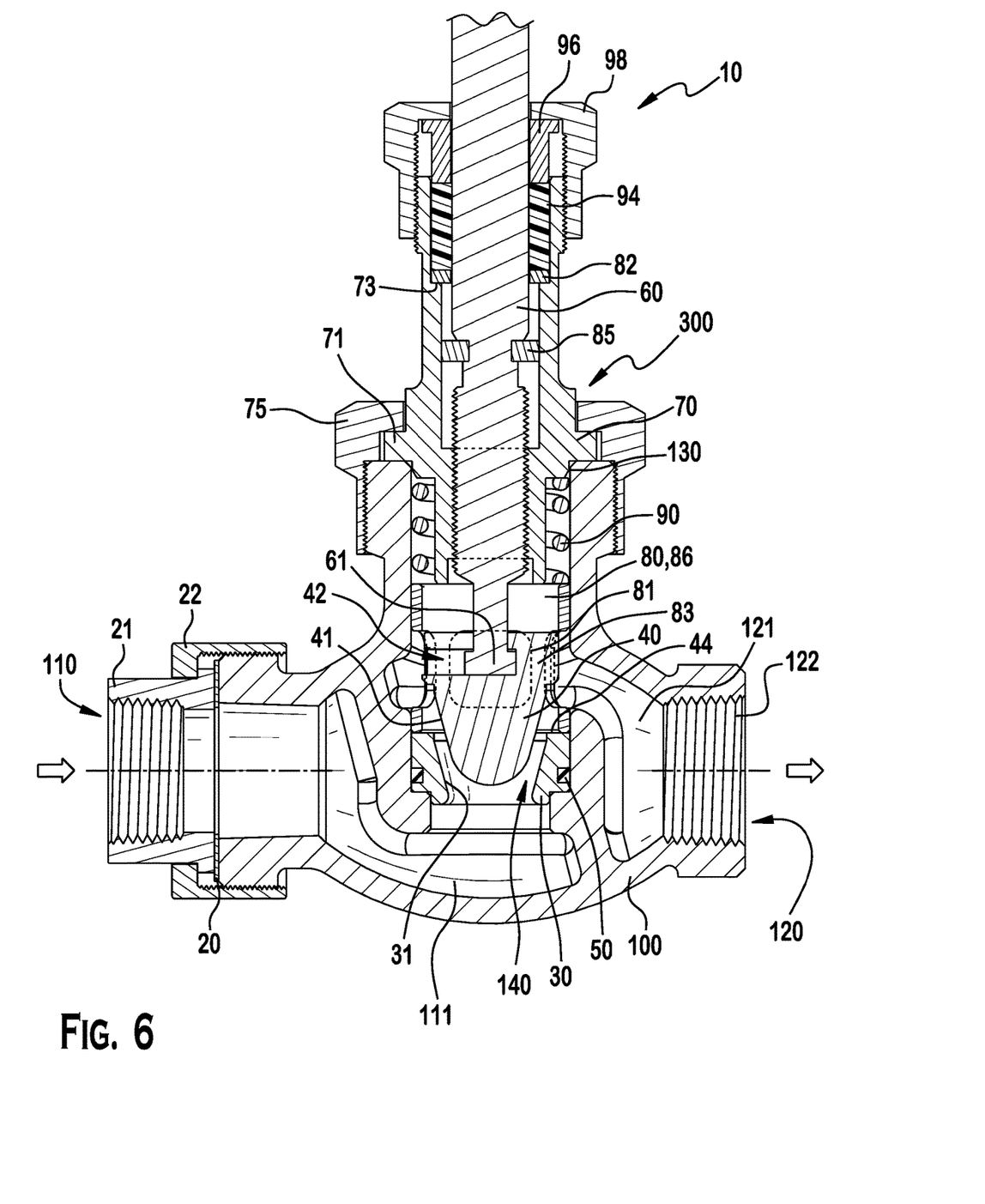
FIG. 6 is a right side cross sectional view of the metering valve of the preceding figures in a partially-closed position in accordance with the present disclosure.
Figure 7:
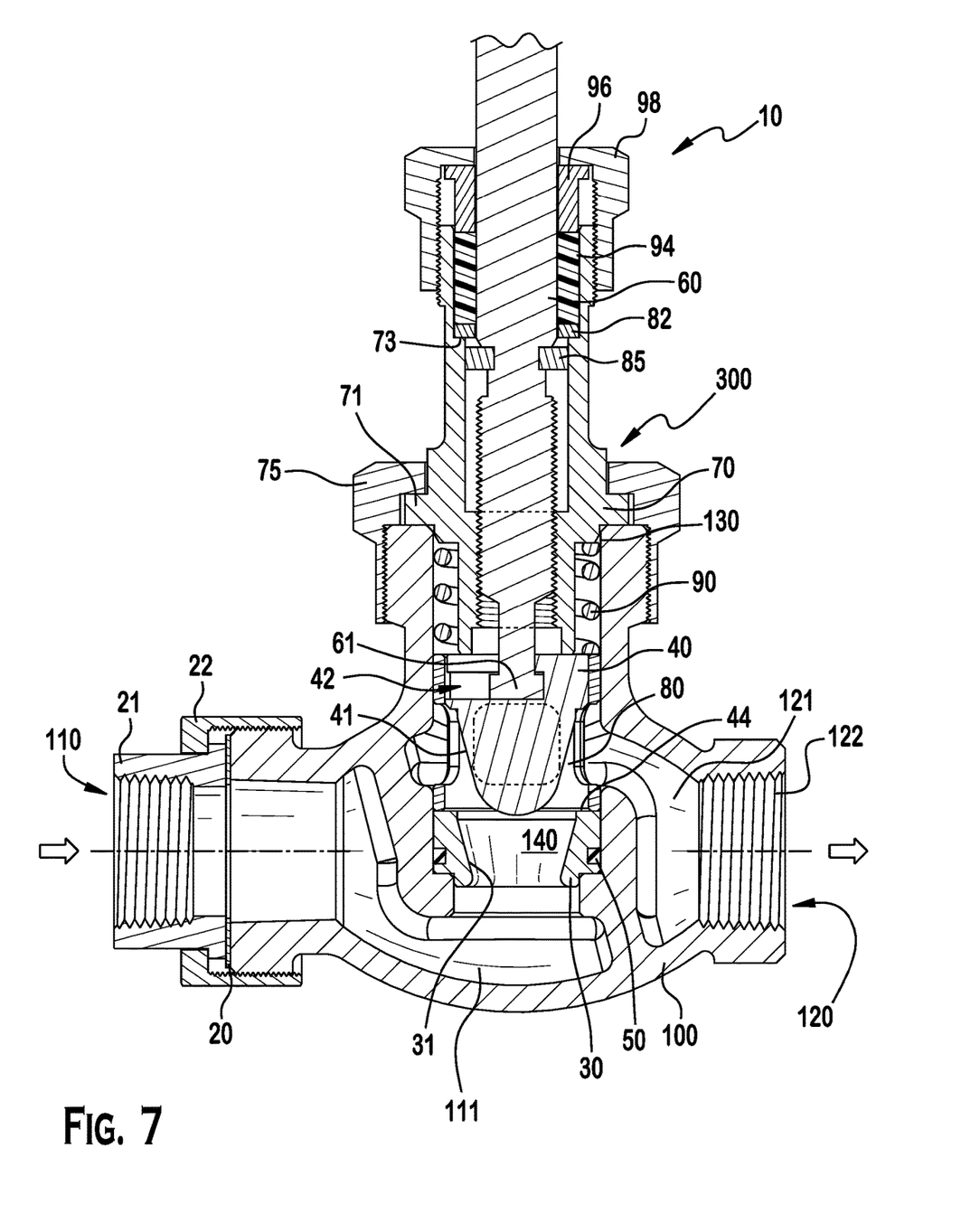
FIG. 7 is a right side cross sectional view of the metering valve of the preceding figures in an open position in accordance with the present disclosure.
Figure 8:
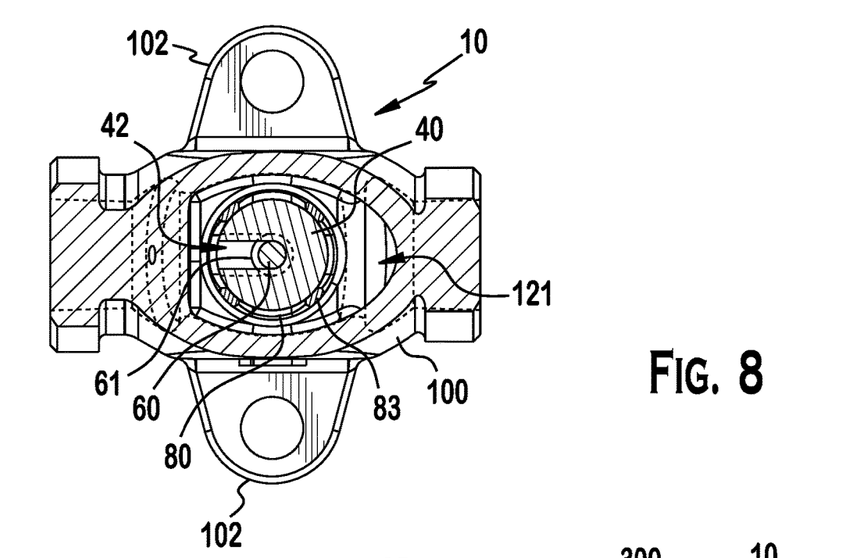
FIG. 8 is top cross sectional view of the metering valve of the preceding figures in accordance with the present disclosure.

Referring generally to FIGS. 1-4, a variable flow metering valve 10 according to an embodiment of the present disclosure includes a main body 100 having a first or inlet end 110 and a second or outlet end 120 arranged generally coaxially with one another through the main body. The inlet end 110 is configured to be attached to a source of pressurized fluid. The fluid is selectively provided to the outlet end 120 under variable flow control provided by a valve assembly 300. The inlet end 110 may comprise a union assembly including a union gasket 20, a threaded tail piece 21, and an inlet union nut 22 attached to a threading formed on the inlet end 110, as shown in FIGS. 5-7. Likewise, the outlet end 120 may include a similar union assembly or may comprise generally only a threaded portion 122 (e.g., NPT threads) for adjoining to a complementary threaded end of a conduit. The main body 100 may further define one or more mounting features, such as lateral flanges 102 for fixing the valve 10 to an object and/or for mounting associated actuating components, such as a rotatory actuator associated with the valve assembly 300 for controlling the operation of the valve 10.

The main body 100 further defines a valve opening 130. In the exemplary embodiment, a central axis of the valve opening 130 is formed through the body 100 generally normal to a central axis shared by the inlet end 110 and outlet end 120. The valve assembly 300 is arranged within the valve opening 130, and generally between the inlet end 110 and outlet end 120 for adjusting the flow-rate of fluid provided to the outlet end 120. More specifically, and referring to FIGS. 5-10, the valve opening 130 receives the valve assembly 300 therein, which extends through a generally hollow interior thereof and into a sealing space 140 defined between an internal inlet fluid passage 111 and an internal outlet fluid passage 121. Within the sealing space 140, the axial position of at least a portion of the valve assembly 300 dictates the flow of fluid through the valve 10, and in particular, between the passages 111 and 121.

Still referring to FIGS. 5-10, the valve assembly 300 includes a seal ring 30 seated within the sealing space 140 in a sealed manner via an annular seal, such as an O-ring seal 50. The seal ring 30 defines an internal tapered sealing surface 31 for selectively receiving and engaging with a corresponding exterior tapered sealing surface 41 of a moveable piston 40 of the valve assembly 300. The piston 40 is attached to a moveable end of a valve stem 60. More specifically, in one embodiment, the piston 40 comprises a slotted opening 42 formed through at least half of the width of the piston in a radial direction and is configured to capture a corresponding protruding free end 61 of the valve stem 60. More specifically, the free end or head 61 comprises an expanded radius compared to a portion of the stem 60 immediately adjacent thereto. The slotted opening 42 of the piston 40 defines an elongated, inverted "T" shaped slotted opening extending partially therethrough for receiving the protruding free end 61 of the valve stem 60, generally capturing the piston on the free end of the stem.

In the exemplary embodiment, the slotted opening 42 is sized such that with the free end 61 of the valve stem 60 fully inserted therein, a central axis of the piston 40 is aligned with a central axis of the stem. The slotted opening 42 and/or the protruding end 61 are sized such that at least one degree of freedom of movement of the piston 40 relative to the valve stem 60 is provided in a mounted or attached state. In one embodiment, when in the mounted state with the valve stem 60, the piston 40 is moveable or floatable within the slotted opening 42 in a plurality of radial directions with respect to a central axis of the stem. In this way, accurate positioning, or self-centering, of the piston 40 relative to the seal ring 30 is enabled, countering any inherent misalignment or tolerance mismatches. While generally fixed in an axial direction, the slotted opening 42 and/or valve stem 60 may be sized so as to permit a degree of float of the piston 40 in the axial direction of the stem in addition to the one or more radial directions. As a result, overall sealing performance is improved and component wear is minimized by the floating connection.

Figure 9:
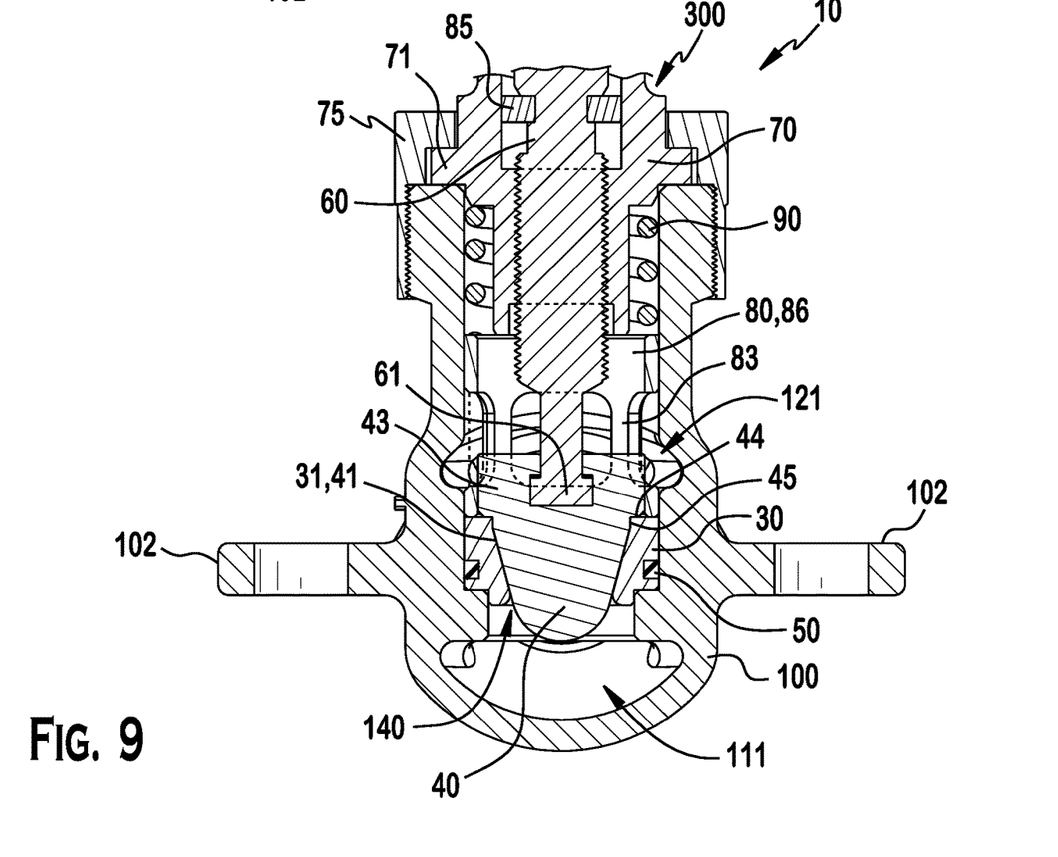
FIG. 9 is a front cross sectional view of the metering valve of the preceding figures in accordance with the present disclosure.
Figure 10:
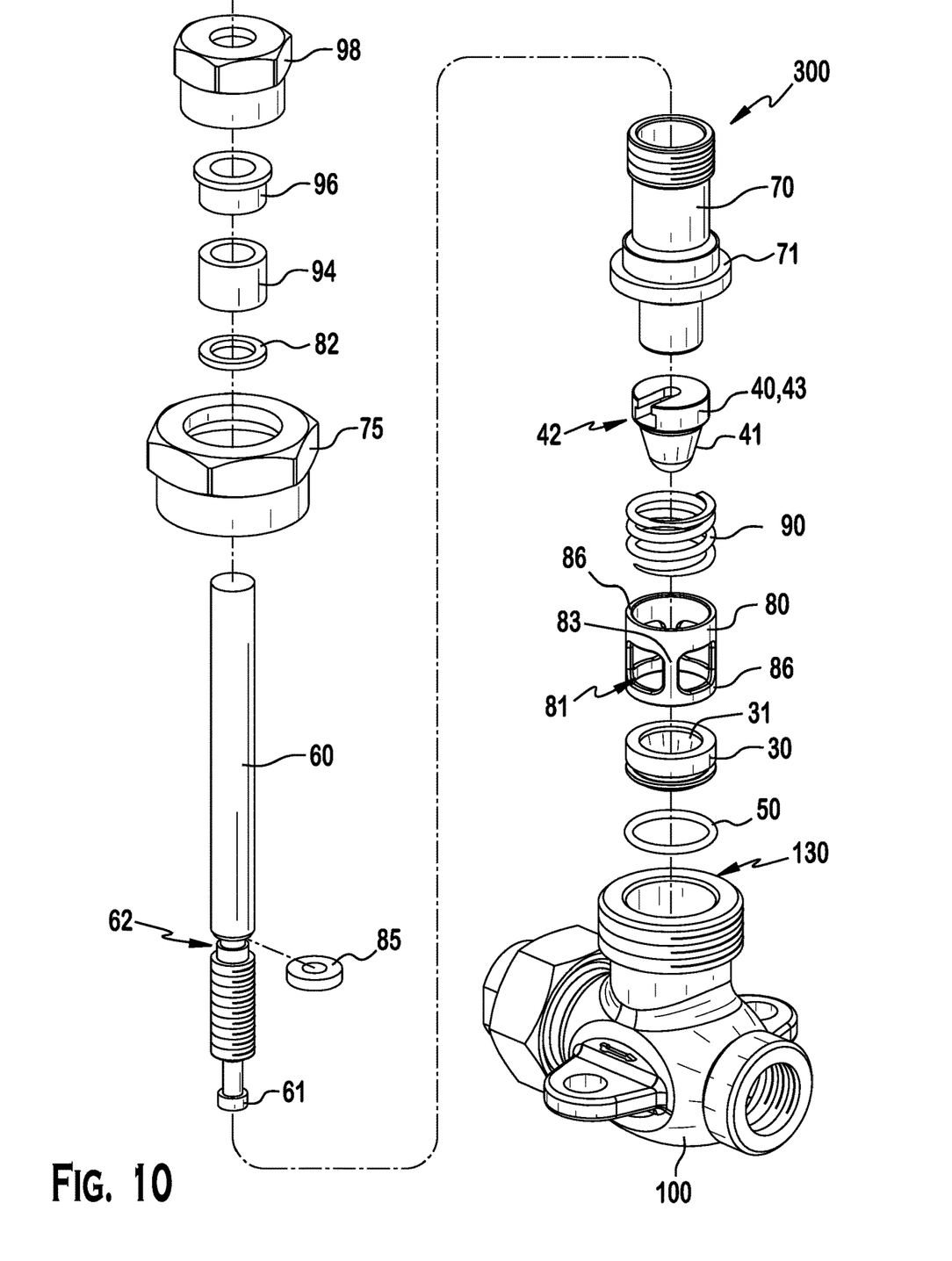
FIG. 10 is an exploded view of a valve assembly of the metering valve of the preceding figures in accordance with the present disclosure.

As shown with particularity in FIG. 9, the piston 40 comprises a generally conical profile with a tapering annular sidewall 41, and a flange or stepped portion 43 extending radially from a rear end thereof. In the exemplary embodiment, the slotted opening 42 is formed through the flange or stepped portion 43 proximate the rear of the piston 40. The flange 43 defines a surface 44 opposing the sealing ring 30 in the axial direction of the valve assembly 300. Further, the tapering annular sidewall 41 transitions into a generally vertical section 45 prior to the formation or radial projection of the flange 43, such that the joint formed therebetween comprises a right-angle. As illustrated, the seal ring 30 comprises a corresponding or complementary interior profile, including the tapered sealing surface 31, to that of the piston 40, the details of which are omitted herein for the purposes of brevity.

Still referring to FIGS. 5-10, the valve assembly 300 further includes a lantern 80 through which the piston 40 is received in an assembled state of the valve 10. The lantern 80 is sized so as to guide the tapered piston 40 therethrough and into a predetermined orientation or coaxial alignment with the seal ring 30. In the exemplary embodiment, the lantern 80 defines a cage-like structure including a generally hollow cylindrical body having upper and lower continuous annular ends 86 connected by a sidewall 83 defining a plurality of openings 81. The lantern 80 and openings 81 are adapted to stabilize or normalize the otherwise turbulent flow of fluid through the lantern in an open state of the valve, and more specifically fluid flow between the inlet fluid passage 111 and the outlet fluid passage 121.

The valve assembly 300 further includes a bonnet 70 fitted at least partially within the valve opening 130 of the main body 100. The bonnet 70 includes a central bore at least partially threaded along its length for threadably engaging with the valve stem 60. In this way, the valve stem 60 is axially translatable relative to the bonnet 70 via its selective rotation. This may be achieved via, for example, a handle (not shown) fitted to a free end of the stem 60. In an alternative embodiment, a driving motor (not shown) would be adapted to the stem 60 to adjust flow rates. The bonnet 70 further defines a mounting flange 71 abutting the valve body 100 on a first side thereof and a bonnet nut 75 on a second side. The bonnet nut 75 and the valve opening 130 may be correspondingly threaded, securing the valve assembly 300 to and/or within the valve body 100. A spring 90 is arranged between a top of the lantern 80 and an opposing spring seating surface of the bonnet 70. The spring 90 acts on the seal ring 30 and the lantern 80 within the valve body 100, ensuring their accurate positioning for efficient operation and minimizing component movement and related wear. As can be visualized in FIG. 5, an annular stem stop 85 is fixed within a corresponding annular channel or groove 62 of the stem 60 and functions to limit the axial travel of the stem 60 relative to the bonnet 70.

Figures 11, 12:
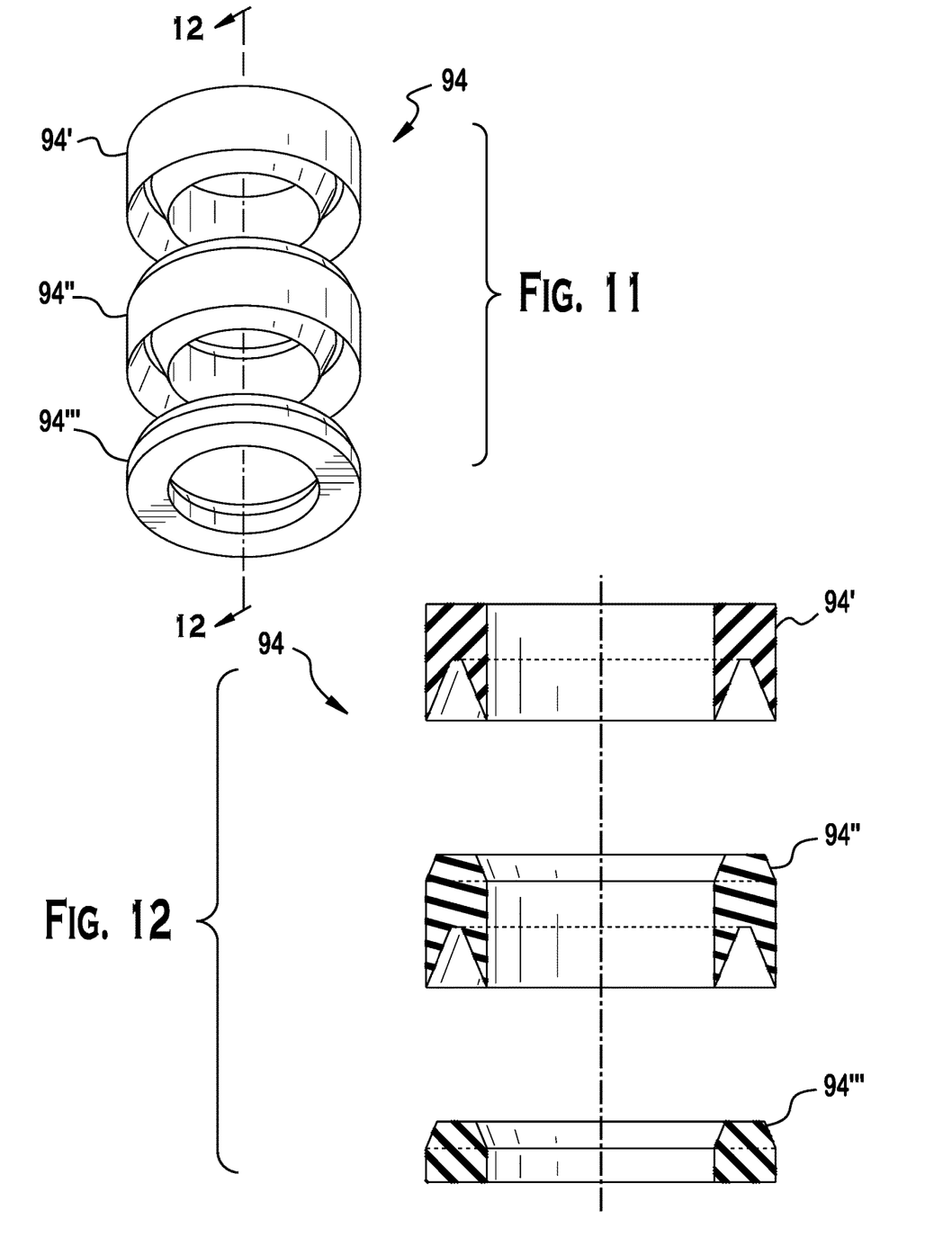
FIG. 11 is an exploded view of a packing ring assembly according to an embodiment of the present disclosure.
FIG. 12 is a cross sectional view of the packing ring assembly of FIG. 11.

The valve assembly 300 includes a packing assembly. Specifically, arranged at an end of the bonnet 70 opposite the piston 40, a retaining ring 82 oppNO singly abuts an annular step 73 defined within an interior of the bonnet 70, and defines a mechanical stop for the packing assembly, including a packing ring 94 and a packing gland 96. The assembly including the retaining ring 82, the packing ring 94 and packing gland 96 is held within the bonnet 70 via a threaded connection. Specifically, a packing nut 98 is threadably engaged with or onto an end of the bonnet 70 for selectively compressing the packing assembly as desired or predetermined amount, ensuring optimal sealing characteristic is maintained. The use of the packing ring 94 ensures equal pressure is applied to the stem 60 via the packing ring 94, which may be embodied as a multi-element seal (e.g., a PTFE seal). Specifically, referring to FIGS. 11 and 12, the packing ring 94 may comprise an assembly including a top or female ring 94', a central or V-ring ring 94" and a male or bottom ring 94'''. (See FIGS. 11 and 12)

FIGS. 5-7 illustrate cross-sections of the metering valve 10 in closed, partially-open, and fully-open positions, respectively. In the closed position shown in FIG. 5, fluid is prevented from passing between through the sealing space 140 via the engagement between the piston 40 and the seal ring 30. More specifically, the selective rotation of the stem 60 (e.g., via a mechanical or electrical actuator attached to an end thereof) translates the piston 40 axially downward and into contact engagement with the interior wall of the seal ring 30. As shown in FIG. 6, rotation of the stem 60 counter-clockwise, retracts the piston 40 from engagement with the seal ring 30, permitting fluid to enter the sealing space 140, enabling a degree of fluid communication between the inlet passage 111 and outlet passage 121 through the lantern 80 and its corresponding openings 81. FIG. 7 illustrates the fully-open position, wherein full or near full retraction of the stem 60 raises the piston 40 into the lantern 80, maximizing the area of fluid communication between the inlet passage 111 and the outlet passage 121 and through the lantern.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A fluid metering valve, comprising:
   a valve body having an inlet opening and an outlet opening; and
   a valve assembly arranged at least partially within the valve body between the inlet opening and outlet opening to adjust the flow-rate of a fluid provided to the outlet opening, the valve body further includes a valve opening receiving at least a portion of the valve assembly, a bonnet selectively attached to the valve body within the valve opening, the valve assembly having
      a seal ring enclosed within the valve body and defining an opening in communication with the inlet opening and the outlet opening, the seal ring having an internal tapered sealing surface; and
      a valve stem; and
      a piston with conical profile with a tapering annular sidewall moveably mounted to the valve stem, a lantern arranged within the housing, the lantern defining a generally hollow body configured to guide the movement of the piston therethrough, the body defined by at least one sidewall having at least one flow stabilizing opening formed therethrough in selective communication with the inlet opening, a compression spring arranged between the bonnet and the lantern for maintaining the position of the lantern within the valve body in an axial direction of the stem, the valve stem and piston moveable into and out of sealing contact with the internal tapered sealing surface of the seal ring for selectively receiving and engaging with a corresponding exterior tapered sealing surface of the piston for selectively permitting fluid flow between the inlet opening and the outlet opening through the opening in the seal ring.

2. The fluid metering valve of claim 1, wherein a mechanical connection between the valve stem and the piston permits at least one degree of freedom of movement of the piston relative to the valve stem with the piston mounted to the valve stem.

3. The fluid metering valve of claim 2, wherein the piston defines a radially extending slot formed therein for receiving a corresponding portion of the stem.

4. The fluid metering valve of claim 3, wherein the slot includes a T-shaped cross section.

5. The fluid metering valve of claim 3, wherein an end of the stem defines a radial protrusion configured to slidably engage with the slot for mounting the piston to the stem.

6. The fluid metering valve of claim 5, wherein when mounted to the stem, the piston is at least partially moveable within the slot in a plurality of radial directions with respect to a central axis of the stem.

7. The fluid metering valve of claim 1, wherein the opening of the seal ring and the exterior surface of the piston comprise corresponding tapered sealing surfaces.

8. The fluid metering valve of claim 1, wherein the seal ring and the piston define seating surfaces opposing in an axial direction of the stem and arranged adjacent to respective ones of the tapered sealing surfaces.

9. The fluid metering valve of claim 1, further comprising a multi-element stem seal arranged between the bonnet and the stem.

10. The fluid metering valve of claim 9, further comprising a packing nut threadably fitted to an end of the bonnet and having an opening for receiving the stem therethrough.

11. The fluid metering valve of claim 10, further comprising a packing ring arranged over the stem and between the packing nut and the stem seal.

12. The fluid metering valve of claim 11, further comprising a retaining ring arranged between the bonnet and the stem seal in an axial direction, wherein the stem seal is selectively compressible between the packing ring and the retaining ring in response to a compressive force placed thereon by the packing nut.

13. The fluid metering valve of claim 1, wherein a flange defines a surface opposing a sealing ring in the axial direction.

* * * * *